(12) United States Patent
Funano et al.

(10) Patent No.: US 7,866,640 B2
(45) Date of Patent: Jan. 11, 2011

(54) BUSH

(75) Inventors: Tuyoshi Funano, Saitama (JP); Takuya Yanagida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1055 days.

(21) Appl. No.: 11/643,181

(22) Filed: Dec. 21, 2006

(65) Prior Publication Data

US 2007/0145657 A1    Jun. 28, 2007

(30) Foreign Application Priority Data

Dec. 27, 2005    (JP) .............................. 2005-374626

(51) Int. Cl.
*B60G 11/22* (2006.01)
(52) U.S. Cl. .................................... 267/293; 267/141.4
(58) Field of Classification Search ................. 267/293, 267/292, 140.11, 141, 141.2, 141.4, 141.5; 384/222, 221, 235, 262; 280/5.516, 5.515, 280/5.523
See application file for complete search history.

(56) References Cited

U.S. PATENT DOCUMENTS

| | | | | |
|---|---|---|---|---|
| 4,139,246 A | * | 2/1979 | Mikoshiba et al. | .......... 384/222 |
| 4,491,429 A | * | 1/1985 | Matoba et al. | .............. 384/221 |
| 6,767,020 B2 | | 7/2004 | Yamamoto et al. | |
| 6,817,599 B2 | | 11/2004 | Kato et al. | |

FOREIGN PATENT DOCUMENTS

| | | |
|---|---|---|
| EP | 1 319 534 A2 | 6/2003 |
| JP | 10-274282 | 10/1998 |
| JP | 2001-113925 | 4/2001 |
| JP | 2003191736 A * | 7/2003 |
| JP | 2003-343625 | 12/2003 |
| JP | 2004-232823 | 8/2004 |

* cited by examiner

*Primary Examiner*—Pam Rodriguez
(74) *Attorney, Agent, or Firm*—Carrier Blackman & Associates, P.C.; William D. Blackman; Joseph P. Carrier (57) ABSTRACT

A bush includes an inner cylinder, an outer cylinder, a cylindrical elastic member interposed between the inner cylinder and the outer cylinder, a flange formed on one edge of the outer cylinder, and an elastic brim extending from the cylindrical elastic member. The flange engages with one end face of the cylindrical member, and the elastic brim covers an end face of the flange. The flange includes a thick portion that protrudes toward the elastic brim side.

11 Claims, 11 Drawing Sheets

PRIOR ART

FIG. 11

PRIOR ART

FIG. 12

PRIOR ART

BUSH

The present invention claims priority from Japanese patent application no. 2005-374626 filed on Dec. 27, 2005, the entire content of which is incorporated herein by reference.

BACKGROUND OF THE INVENTION

1. Field of the Invention

The present invention relates to a bush that is incorporated into a connecting portion of a vehicle suspension. More specifically, the present invention relates to a technique by which the setting of a spring constant can be easily changed.

2. Description of the Related Art

Figure 10:
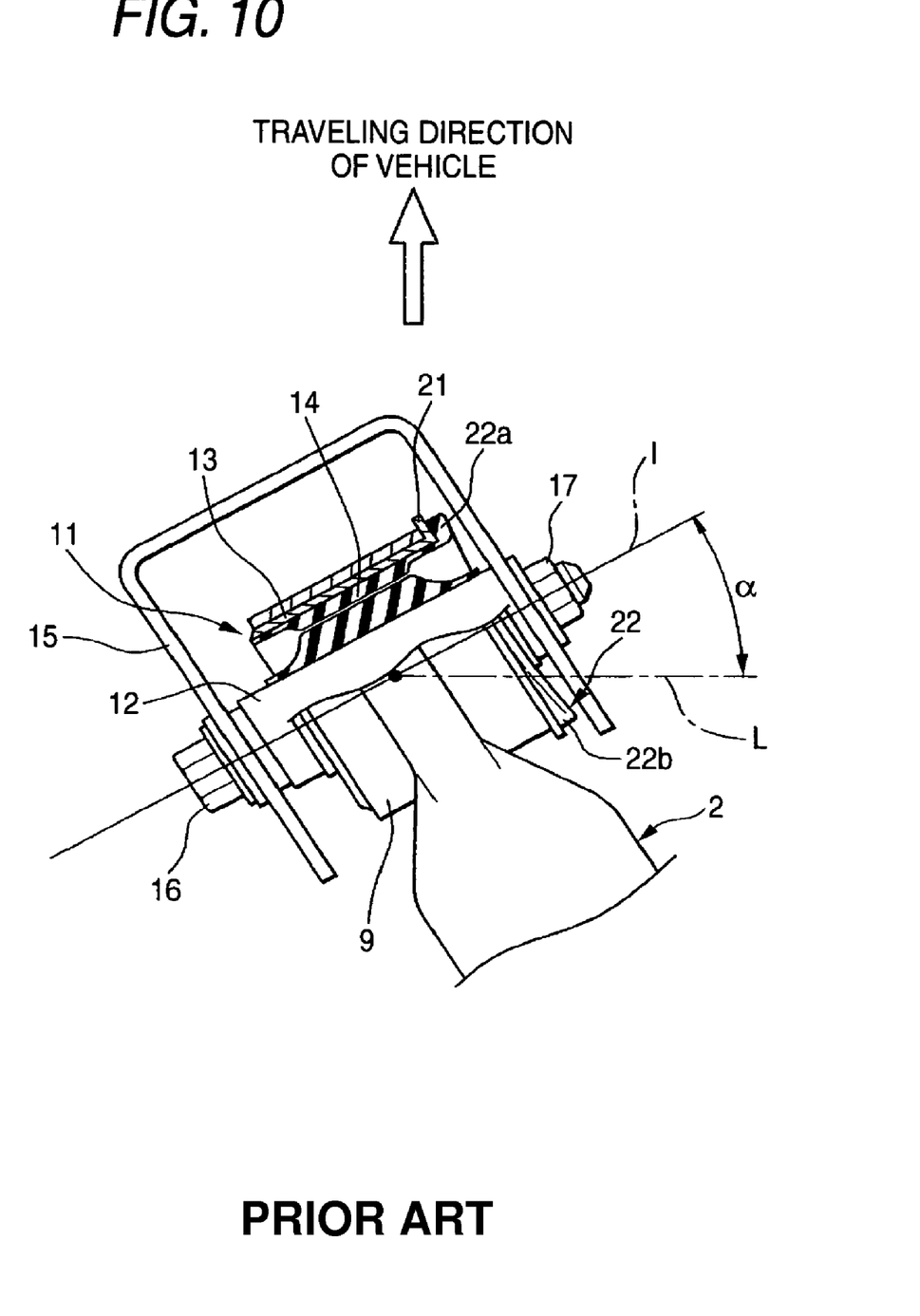
FIG. 10 is a plan view showing a bush according to the related art.

A torsion beam type suspension is one of rear-wheel suspensions used for a front-wheel drive vehicle, in which right and left trailing arms are connected with each other by a torsion beam (see, e.g., JP-A-2001-113925). Although the torsion beam type suspension is relatively simple and compact, it is advantageous in that a comfortable driving and stable turning can be obtained. In the torsion beam type suspension, a bush (compliance bush) is attached to a front end portion of each trailing arm in order to prevent vibration caused by a road surface from being transmitted to a vehicle body (see, e.g., JP-A-2003-343625). As shown in FIG. 10, a bush 11 includes a metallic inner cylinder 12, a metallic outer cylinder 13, and a cylindrical elastic member 14 interposed between the inner cylinder 12 and the outer cylinder 13. The bush 11 is press-fitted into a holding cylinder 9 formed at a front end portion of a trailing arm 2. For a purpose of positioning at the time of press-fitting, a flange 21 that comes into contact with an end face of the holding cylinder 9 is provided on the outer cylinder 13.

When a vehicle turns, a strong force in a lateral direction is applied to the torsion beam type suspension from wheels. Therefore, in order to enhance maneuvering stability of the vehicle, it is necessary to suppress a lateral displacement of the trailing arm 2. Thus, in the bush 11 shown in FIG. 10, an elastic brim 22 is formed so as to cover the flange 21 and to extend from the cylindrical elastic member 14. This elastic brim 22 comes into pressure contact with an inner wall of a vehicle side bracket 15 when the trailing arm 2 moves in the lateral direction. In the trailing arm 2 shown in FIG. 10, the axial center I of the holding cylinder 9 is inclined by a predetermined angle α with respect to the oscillating axis L of the trailing arm 2. The reference numerals 16 and 17 shown in FIG. 10 are a bolt and a nut for attaching the bush 11 to the vehicle side bracket 15.

Figure 11:
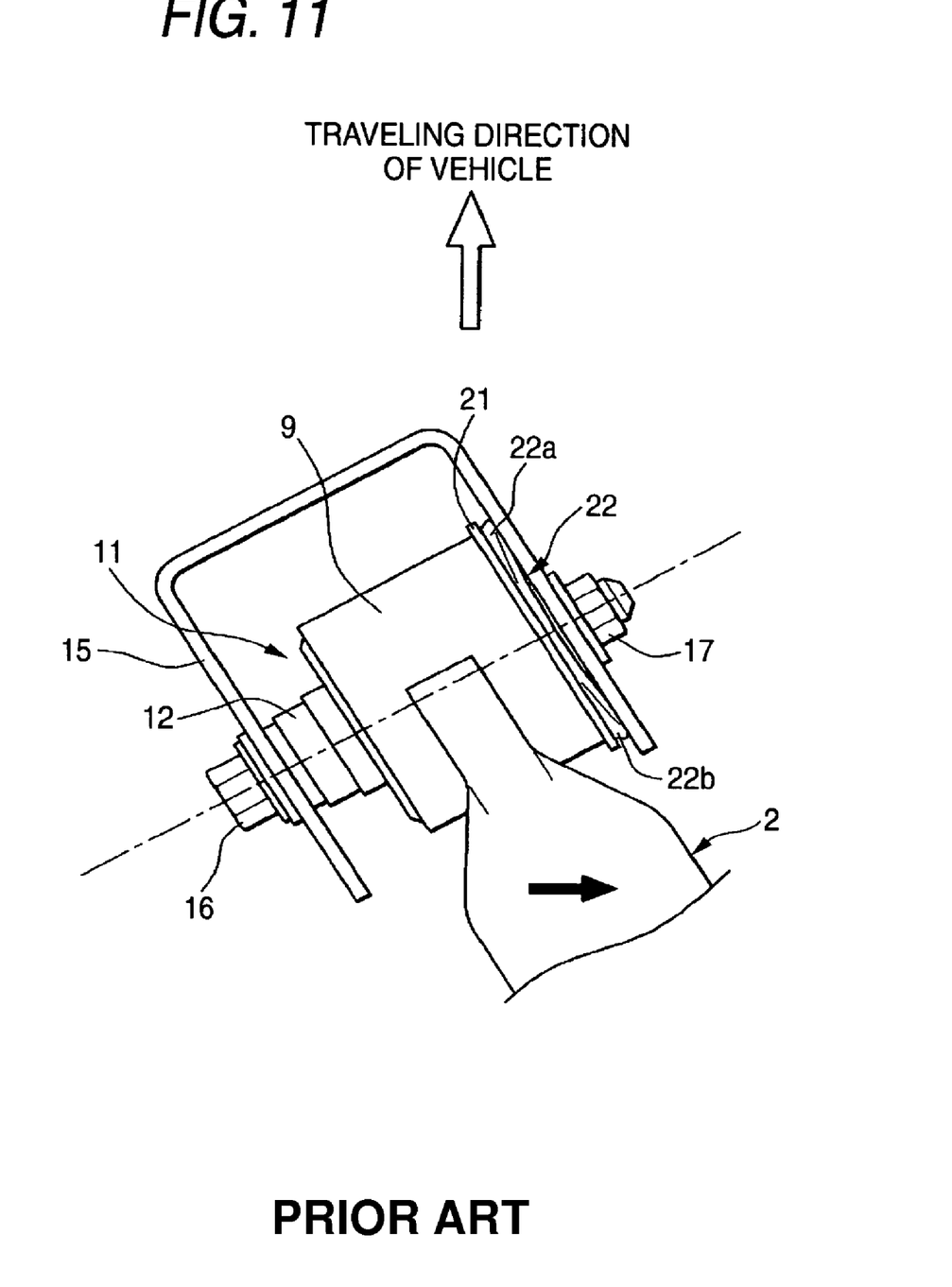
FIG. 11 is a plan view showing a state of operation of the bush according to the related art.
Figure 12:
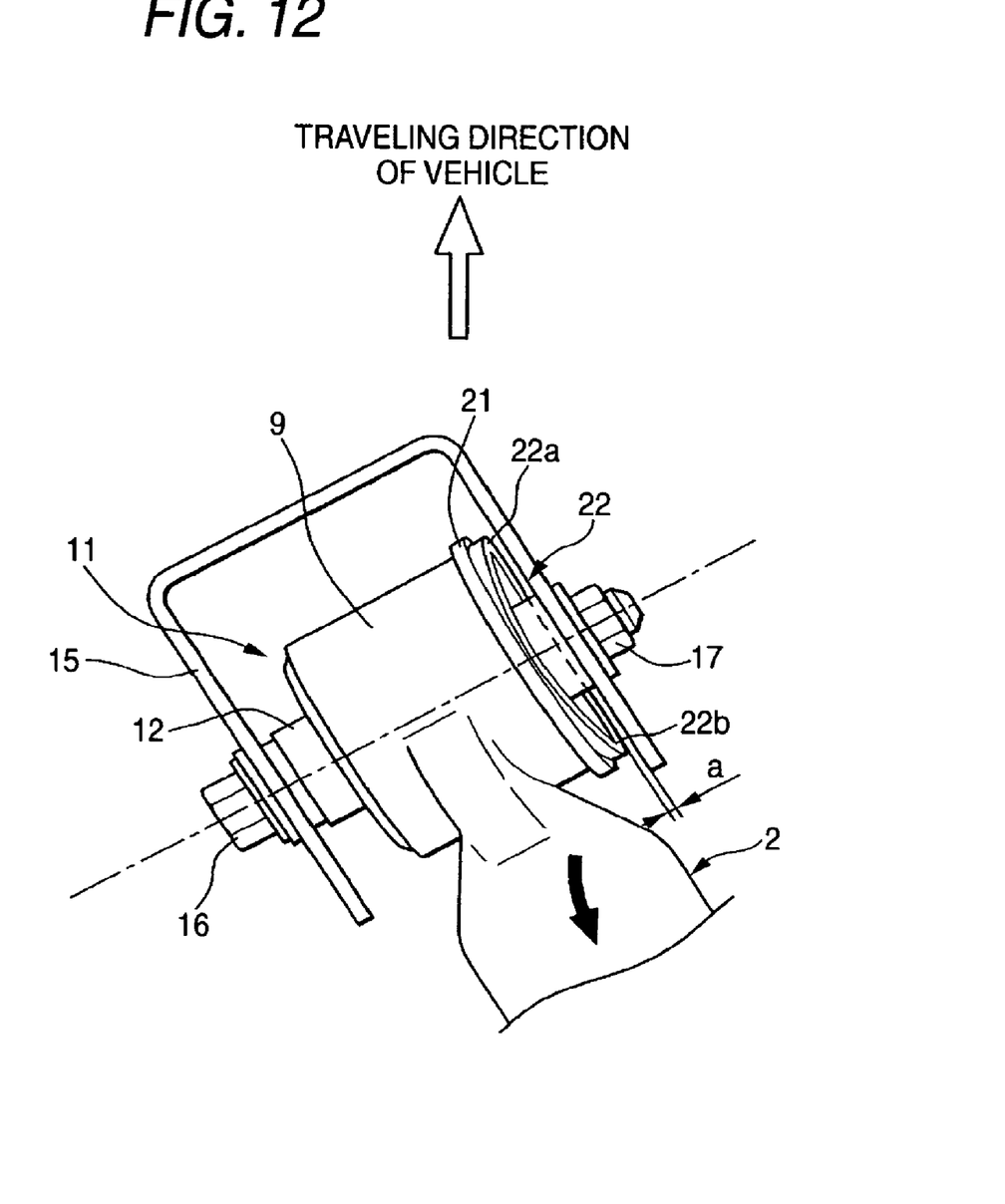
FIG. 12 is a plan view showing another state of operation of the bush according to the related art.

In the bush 11 shown in FIG. 10, thick portions 22a, 22b are respectively formed in a front end portion and a rear end portion of the elastic brim 22, substantially at the center in the vertical direction. Due to such structure, as shown in FIG. 11, in the case where the trailing arm 2 is moved in the lateral direction, the thick portions 22a, 22b of the elastic brim 22 come into elastic contact with the vehicle side bracket 15. Therefore, a displacement in the lateral direction of the trailing arm 2 can be suppressed and the maneuvering stability can be enhanced. As shown in FIG. 12, even in case where the holding cylinder 9 of the trailing arm 2 is rotated when driving on a bad road, a gap "a" exists between the elastic brim 22 and the vehicle side bracket 15, that is, the elastic brim 22 and the vehicle side bracket 15 are not in contact with each other. Therefore, the vehicle is comfortable to drive, and the durability of the elastic brim 22 can be ensured. Further, the generation of noise can be prevented.

However, in the bush 11 described above, when the trailing arm 2 moves in the lateral direction, the thick portions 22a, 22b, which come into elastic contact with the vehicle side bracket 15, are compressed and deformed (or crushed). At this time, since the thickness of the thick portions 22a, 22b is large, an amount of deformation becomes large. Accordingly, an amount of the displacement in the lateral direction of the trailing arm 2 is increased, and it is impossible to enhance the maneuvering stability. Further, in the bush 11, each time the vehicle turns, the thick portions 22a, 22b are greatly compressed and deformed. Therefore, the durability of the elastic brim 22, that is, the durability of the bush 11 is deteriorated. Since the bush 11 is held by being press-fitted into the holding cylinder portion 9, when a permanent set in fatigue is caused by using the bush 11 for a long period of time, there is a possibility that the bush 11 is drawn out from the holding cylinder portion 9.

SUMMARY OF THE INVENTION

It is an object of the present invention is to provide a bush that is improved in maneuvering stability and durability.

According to a first aspect of the invention, a bush includes: an inner cylinder; an outer cylinder; a cylindrical elastic member interposed between the inner cylinder and the outer cylinder; a flange formed along a circumference of one edge of the outer cylinder; and an elastic brim extending from the cylindrical elastic member. The flange engages with one end face of a cylindrical member in which the bush is internally engaged, and the elastic brim covers an end face of the flange. The flange includes a thick portion that protrudes toward the elastic brim side.

According to a second aspect of the invention, the thick portion may include a first thick portion formed on a part of the flange and a second thick portion formed on the other part of the flange that is located on the opposite side of the first thick portion across a center of the circumference of one edge of the outer cylinder.

According to a third aspect of the invention, the elastic brim may include an area increasing portion in which an area is increased along a circumferential direction of the elastic brim.

According to a fourth aspect of the invention, an engaging pawl may be formed on the other edge of the outer cylinder, wherein the engaging pawl engages with the other end face of the cylindrical member.

According to a fifth aspect of the invention, the elastic brim may be formed so as to have a thickness that is substantially constant.

According to a sixth aspect of the invention, the elastic brim may be formed in an elliptical shape.

According to a seventh aspect of the invention, the outer cylinder may be a resin injection molding.

According to an eighth aspect of the invention, a bush includes: an inner cylinder; an outer cylinder; a cylindrical elastic member interposed between the inner cylinder and the outer cylinder; a flange formed along a circumference of one edge of the outer cylinder; and an elastic brim extending from the cylindrical elastic member. The flange engages with an end face of a cylindrical member in which the bush in internally engaged, and the elastic brim covers an end face of the flange. The elastic brim includes an area increasing portion in which an area is increased along a circumferential direction of the elastic brim.

According to a ninth aspect of the invention, the area increasing portion may include a first area increasing portion formed on a part of the elastic brim and a second area increasing portion formed on the other part of the elastic brim that is located on the opposite side of the first area increasing portion across a center of the circumference of one edge of the outer cylinder.

According to a tenth aspect of the invention, the elastic brim may be formed in an elliptical shape.

According to an eleventh aspect of the invention, a suspension of a vehicle includes: a pair of trailing arms, each having a cylindrical member at a front end portion thereof; a torsion beam which connects intermediate portions of the trailing arms; and a bush which is internally engaged in the cylindrical member. The bush includes: an inner cylinder; an outer cylinder; a cylindrical elastic member interposed between the inner cylinder and the outer cylinder; a flange formed along a circumference of one edge of the outer cylinder; and an elastic brim extending from the cylindrical elastic member. The flange engages with one end face of the cylindrical member, and the elastic brim covers an end face of the flange. The flange includes a thick portion that protrudes toward the elastic brim side.

According to a twelfth aspect of the invention, the thick portion may include a first thick portion formed on a front side of the flange with respect to the vehicle and a second thick portion formed on the rear side of the flange with respect to the vehicle.

According to one or more aspects pf the invention, it is possible to reduce the thickness of the elastic brim in the thick portion of the flange. Therefore, the spring constant of the elastic brim at such portion can be increased, thereby making it difficult for the elastic brim to be excessively deformed even when a compressive stress is applied. According to one or more aspects of the invention, while the elastic brim and a vehicle body side bracket are being prevented from coming into contact with each other when driving straight, a movement in the lateral direction of the trailing arm can be effectively suppressed. According to one or more aspects of the invention, surface pressure in the area increasing portion is reduced. Therefore, even when a compressive stress is applied, it is difficult for such area increasing portion to be excessively deformed.

DESCRIPTION OF THE EXEMPLARY EMBODIMENTS

Hereinafter, exemplary embodiments of the invention will be explained with reference to the drawings, the following exemplary embodiments do not limit the scope of the invention.

Figure 1:
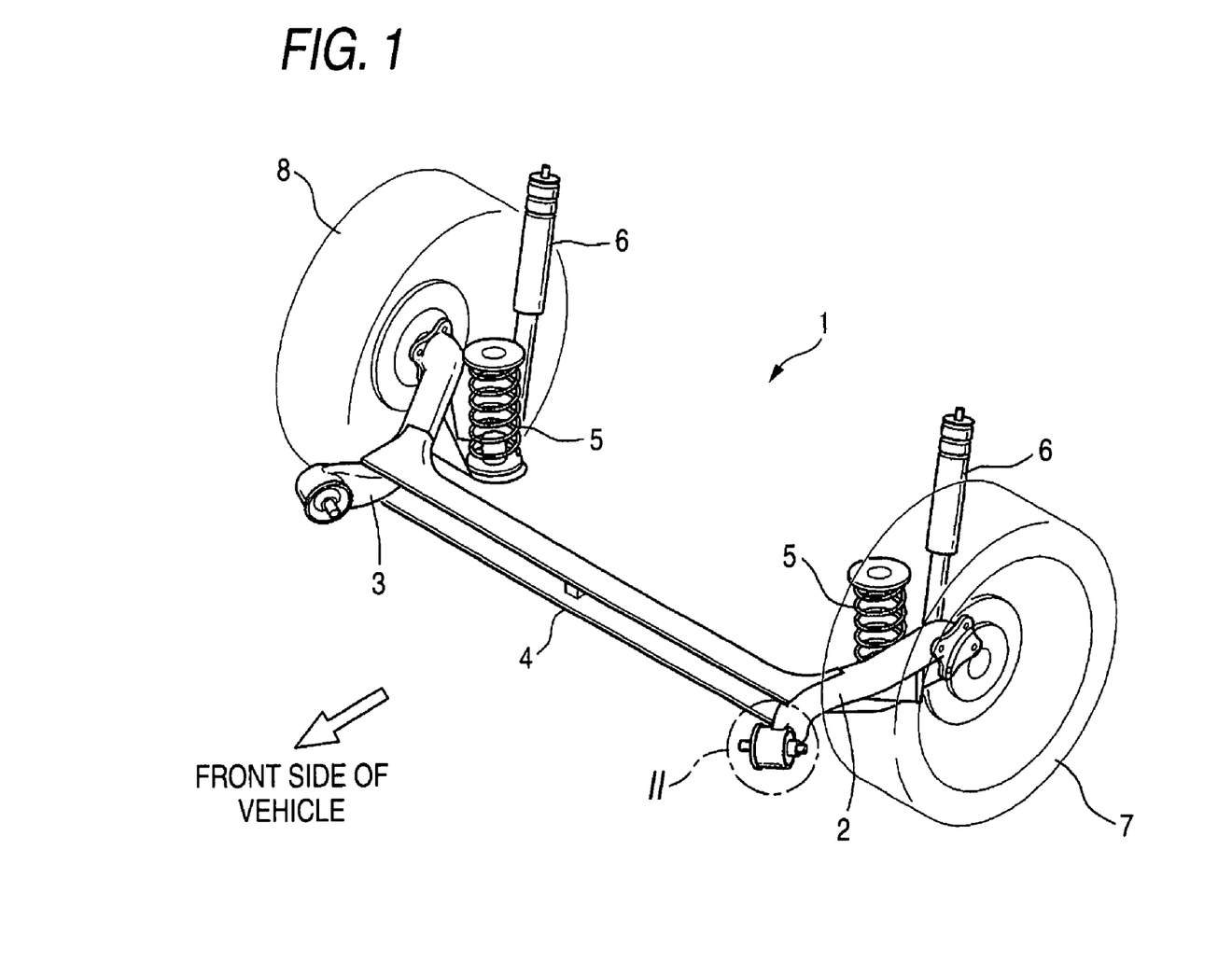
FIG. 1 is a perspective view showing a rear suspension according to an exemplary embodiment of the invention.

As shown in FIG. 1, the rear suspension 1 according to an exemplary embodiment is a torsion beam type suspension of a so-called H-type. The rear suspension 1 includes a left trailing arm 2, a right trailing arm 3, a torsion beam 4 which connects intermediate portions of the trailing arms 2 and 3, a pair of right and left coil springs 5 which are suspension springs, and a pair of right and left hydraulic dampers 6. The suspension 1 suspends a left rear wheel 7 and a right rear wheel 8.

Figure 2:
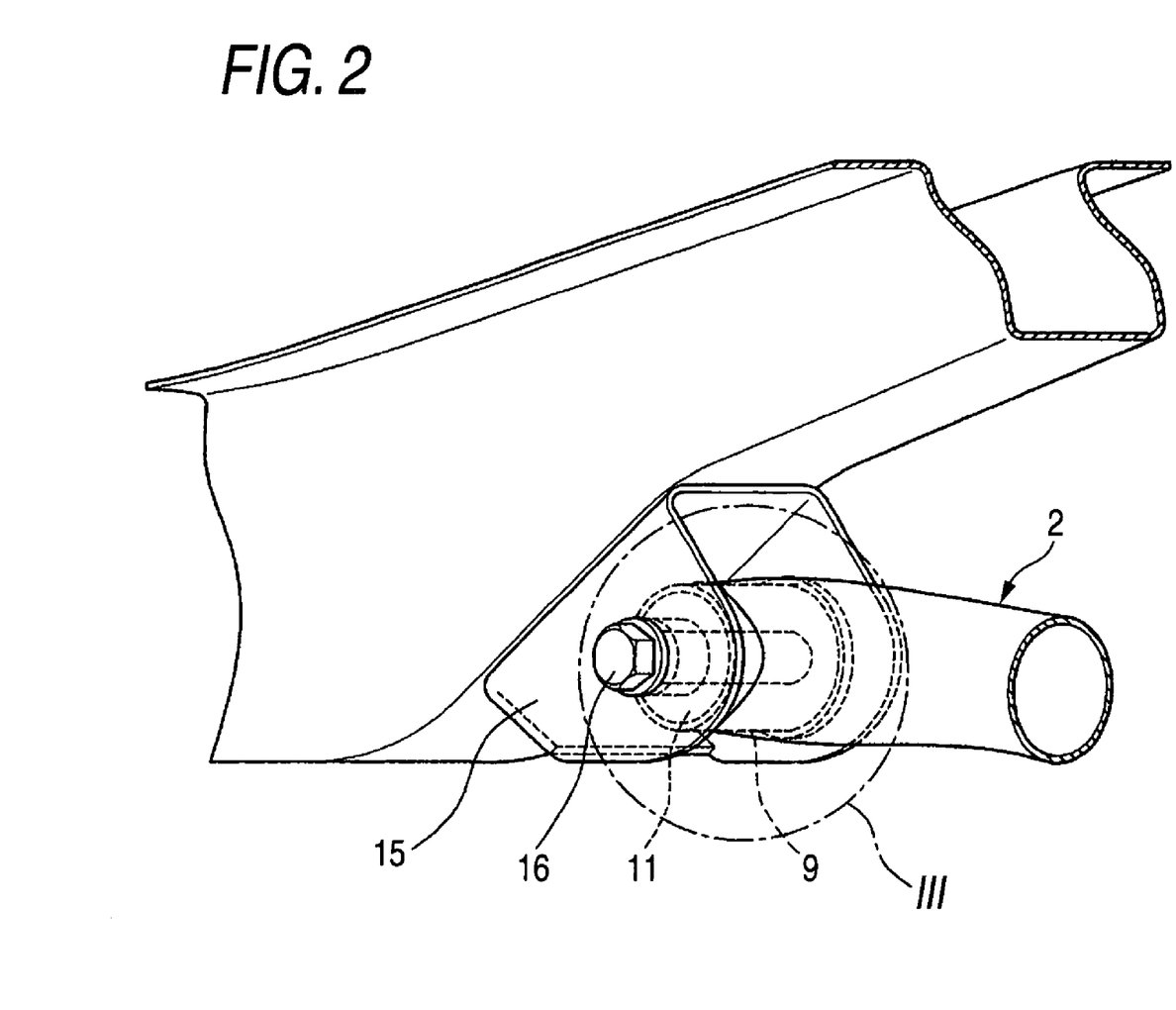
FIG. 2 is a perspective view showing a state in which a portion II in FIG. 1 is connected to a vehicle body.
Figure 3:
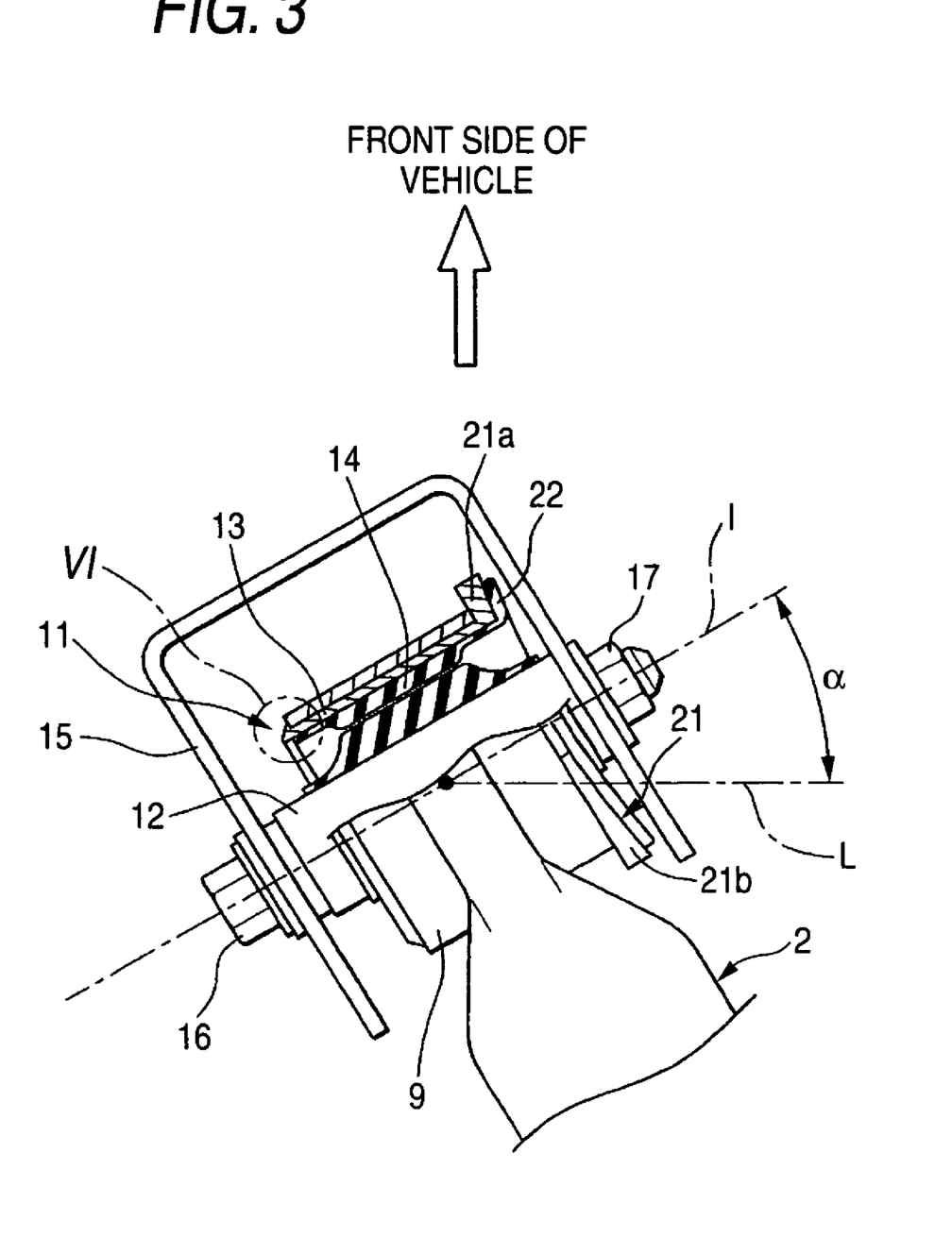
FIG. 3 is an enlarged plan view of a portion III in FIG. 2.

As shown in FIGS. 2 and 3, a holding cylinder 9 is formed at a front end portion of the trailing arm 2. In the holding cylinder 9, a bush (compliance bush) 11 is internally engaged. The bush 11 includes an inner cylinder 12 formed from a steel pipe, an outer cylinder 13 which is a resin injection molding, and a cylindrical elastic member 14 which is interposed and fixed (by means of vulcanizing adhesion) between the inner cylinder 12 and the outer cylinder 13. The bush 11 is connected to a vehicle side bracket 15 by a bolt 16 and a nut 17. As shown in FIG. 3, according to the exemplary embodiment, the axial center I of the holding cylinder 9 is inclined by a predetermined angle a with respect to the oscillating axis L of the trailing arm 2.

Figure 4:
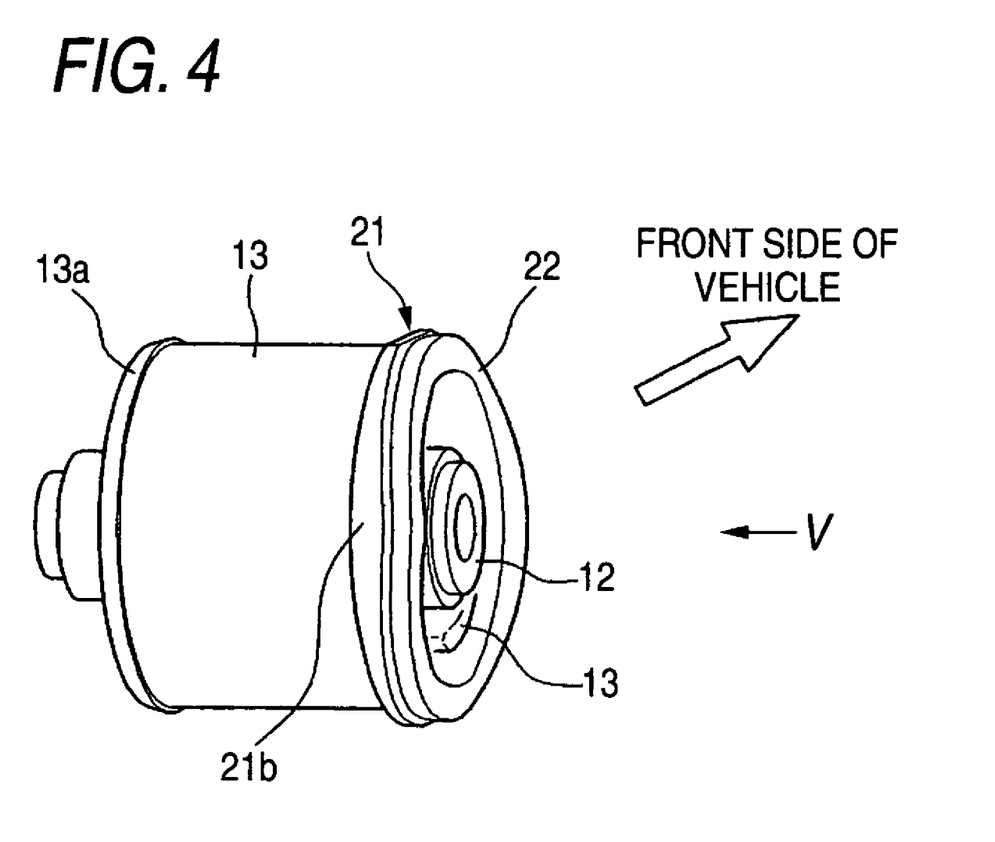
FIG. 4 is a perspective view of a bush according to the exemplary embodiment of the invention.
Figure 5:
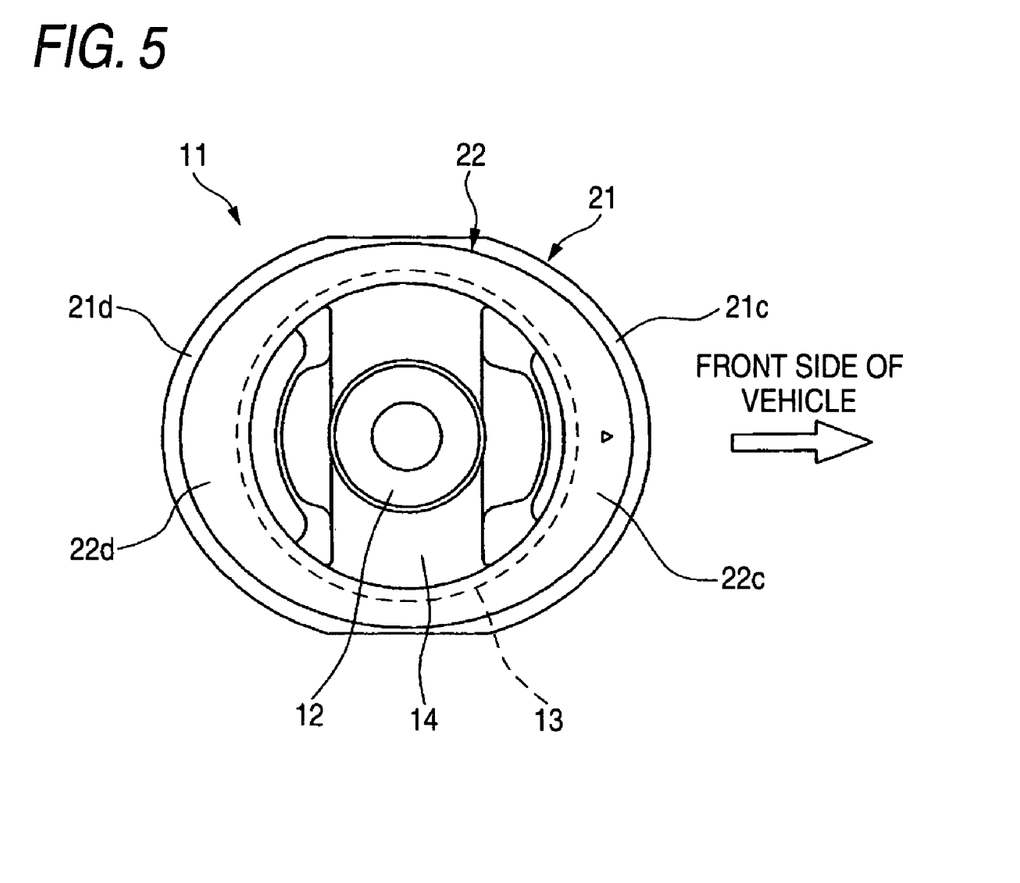
FIG. 5 is a view taken in a direction of an arrow V in FIG. 4.

As shown in FIG. 4, a flange 21 that comes into contact with an end face of the holding cylinder 9 is formed at an inner end portion of the outer cylinder 13 (on the right side in FIGS. 3 and 4), and an elastic brim 22 is disposed so as to extend from the cylindrical elastic member 14 and to cover the flange 21. On a front end portion and a rear end portion of the flange 21, thick portions 21a, 21b protruding toward the elastic brim 22 side are respectively formed, substantially at the central portions in the vertical direction of the flange 21. The elastic brim 22 is formed so as to be disposed along the flange 21 and to have relatively a thin wall thickness that is substantially constant. As shown in FIG. 5, the flange 21 and the elastic brim 22 are both formed in an elliptical shape which is long in a longitudinal direction, thereby forming area increasing portions 21c, 21d, 22c, 22d which are on the front and rear end sides of the flange 21 and the elastic brim 22, respectively.

Figure 6:
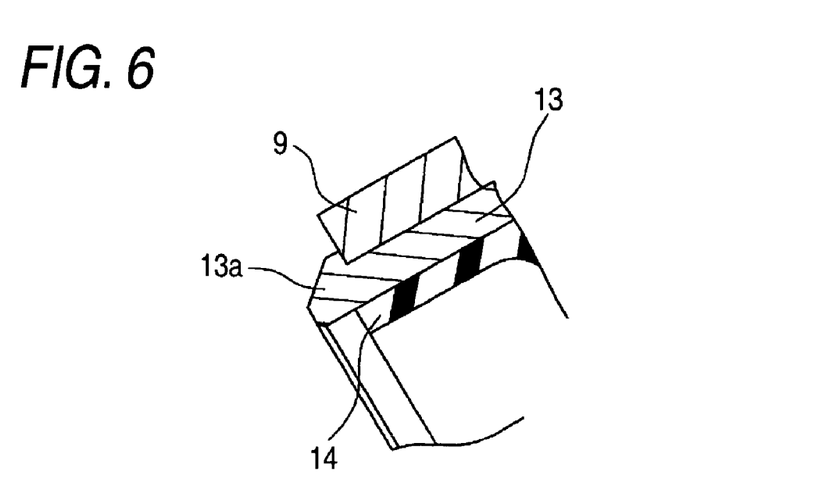
FIG. 6 is an enlarged view of a portion VI in FIG. 3.

As shown in FIG. 6, an annular engaging pawl 13a is formed at an outer edge of the outer cylinder 13. In an assembled state of the bush, the annular engaging pawl 13a engages with an outer end portion of the holding cylinder 9. Since the outer cylinder 13 according to the exemplary embodiment is a resin injection molding, the annular engaging pawl 13a is deflected (elastically deformed) and inserted into the holding cylinder 9 with relatively little effort when assembling the bush 11 and the holding cylinder 9.

Figure 7:
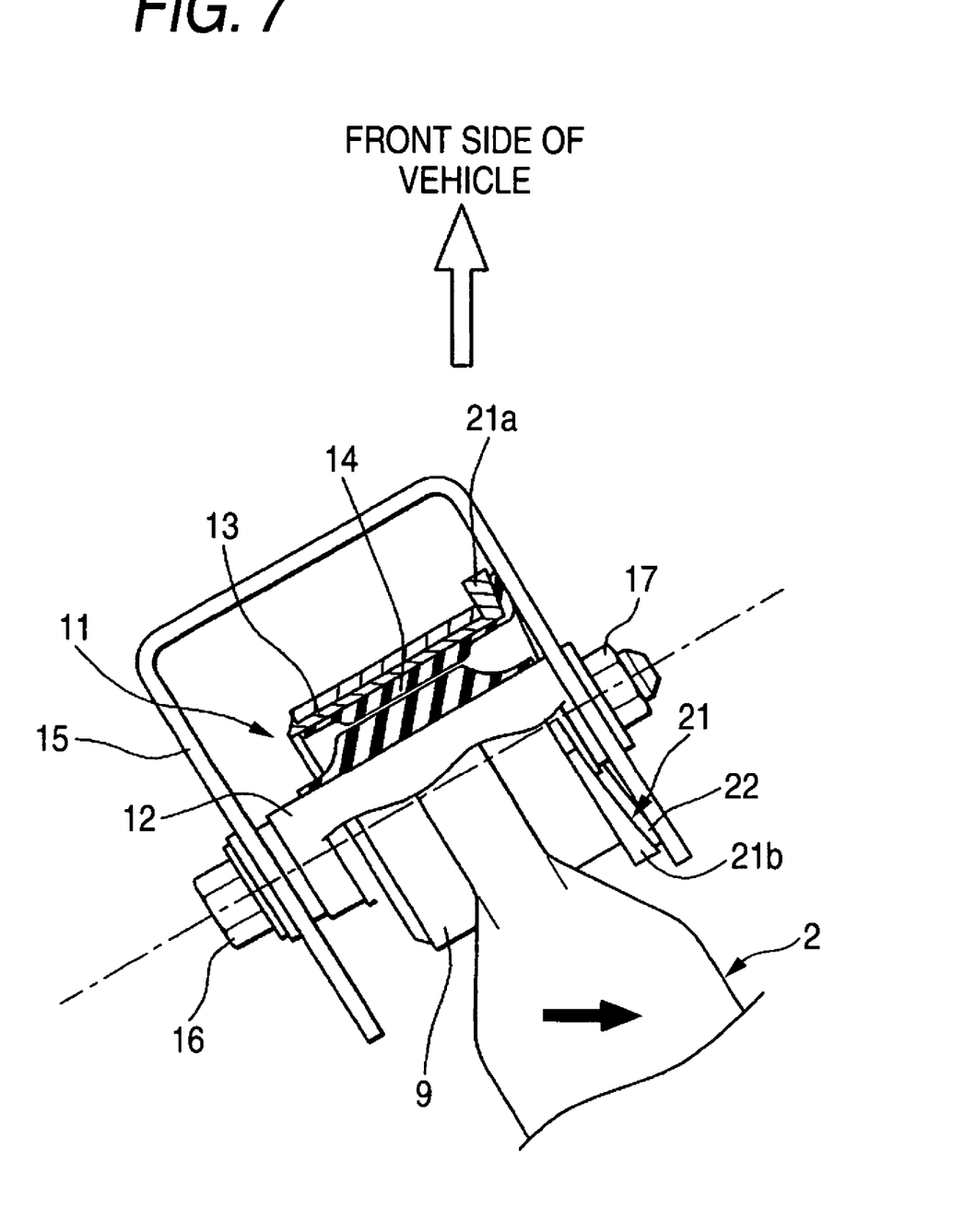
FIG. 7 is a plan view showing a state of operation of the bush according to the exemplary embodiment.

When the vehicle turns, a force in the lateral direction is applied to the rear suspension 1 from the rear wheels 7, 8, and therefore, the trailing arm 2 moves in the lateral direction. For example, when the trailing arm 2 moves to the right, as shown in FIG. 7, the elastic brim 22 of the bush 11 is pressed to a right inner wall of the vehicle side bracket 15.

Figure 8:
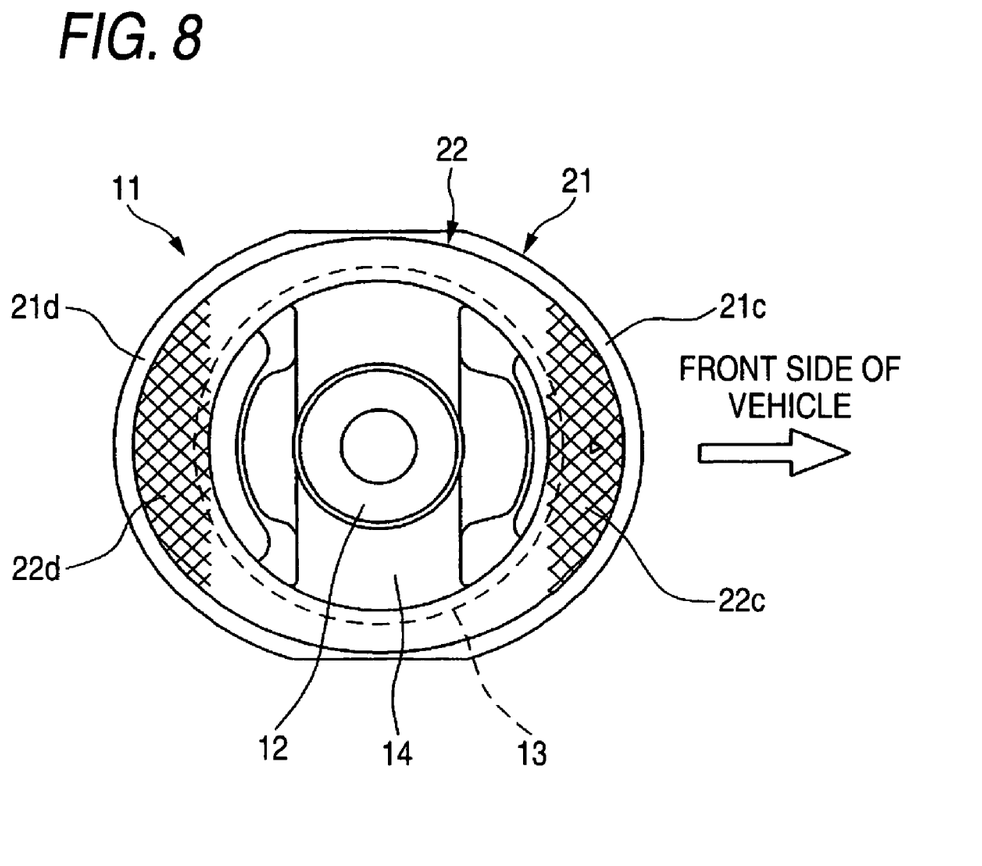
FIG. 8 is a side view showing the state of operation of the bush according to the exemplary embodiment.

According to the exemplary embodiment, the thick portions 21a, 21b are formed at the front and rear end portions of the flange 21 so as to protrude toward the elastic brim 22 side, and the wall thickness of the elastic brim 22 is at the corresponding portion relatively thin, that is, the spring constant in this portion is high. Further, the area increasing portions 22c, 22d are formed on the front and rear end sides of the elastic brim 22. Therefore, when the elastic brim 22 of the bush 11 is pressed to a right inner wall of the vehicle side bracket 15, the pressure contacting area (shown in a hatching in FIG. 8) therebetween is increased. As a result, a deformation of the elastic brim 22 can be suppressed to be very small, and an amount of displacement of the trailing arm 2 is also suppressed to be small. Accordingly, the maneuvering stability as well as the durability of the elastic brim 22 can be remarkably enhanced. Furthermore, the bush 11 according to the exemplary embodiment is engaged with the holding cylinder 9 of the trailing arm 2 by the annular engaging pawl 13a of the outer cylinder 13. Therefore, even when the bush is used over a long period of time, that is, even when the vehicle is driven over a long period of time, the bush 11 is prevented from being drawn out from the holding cylinder portion 9.

Figure 9:
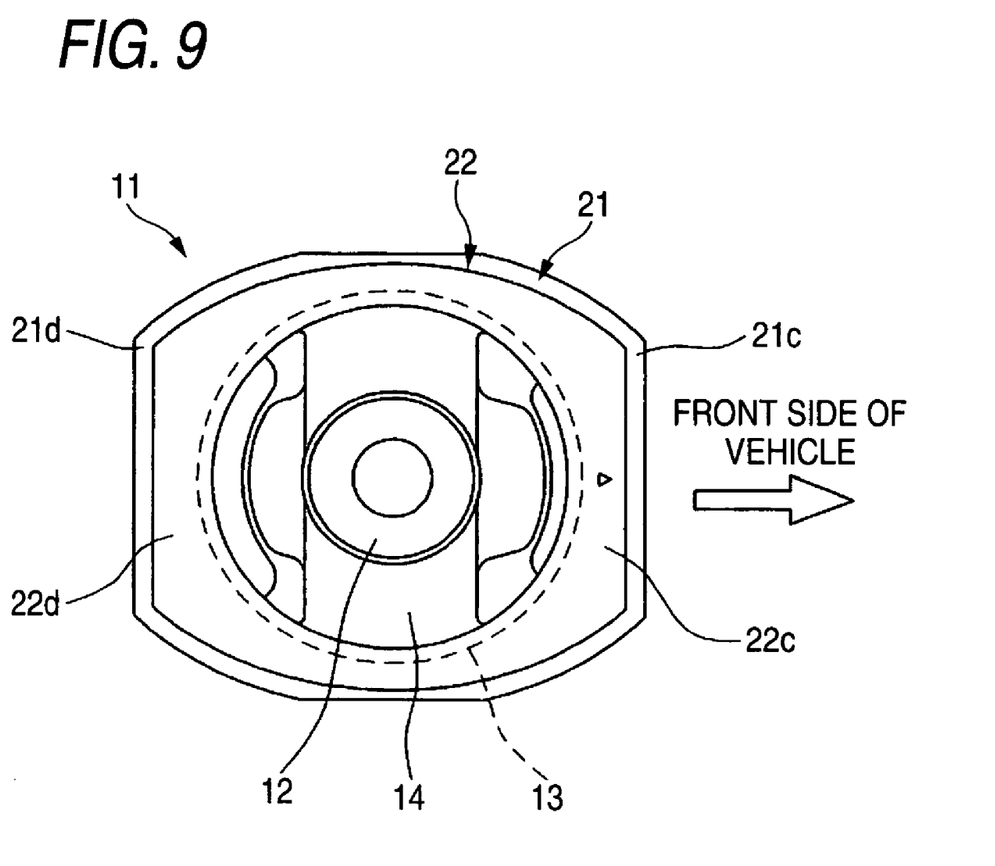
FIG. 9 is a side view showing a bush according to another exemplary embodiment.

In the above exemplary embodiment, the present invention is applied to a compliance bush used in a torsion beam type suspension of an H-type. However, the present invention may be applied to a bush used in others types of rear suspensions or front suspensions. Also, in the above exemplary embodiment, the thick portions are formed on the front and the rear ends of the flange, and the area increasing portions are formed on the front and the rear ends of the elastic brim. However, only one of them may be adopted. In the above exemplary embodiment, the elastic brim is formed into an elliptical shape which is long in the longitudinal direction. However, in case where an arrangement space is limited in the longitudinal direction, a front and a rear end portion of the ellipse may be cut off as shown in FIG. 9. Further, a specific shape of each portion of the bush may be appropriately changed as long as it does not deviate from the scope of claim of the present invention.

While description has been made in connection with exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A bush which is internally engaged in a cylindrical holding member, said bush comprising:
    an inner cylinder;
    an outer cylinder;
    a cylindrical elastic member interposed between the inner cylinder and the outer cylinder;
    a flange formed along a circumference of a first edge of the outer cylinder; and
    an elastic brim extending from the cylindrical elastic member;
    wherein the flange engages with a first end face of the cylindrical holding member,
    the elastic brim covers an end face of the flange, and
    the flange includes a thick portion that protrudes toward the elastic brim side and increases in thickness as the flange extends radially outwardly, said thick portion protruding further outwardly, in a direction towards the elastic brim, than a central portion of the flange.

2. The bush according to claim 1, wherein the thick portion includes a first thick portion formed on a first part of the flange and a second thick portion formed on a second part of the flange which is substantially diametrically opposed to said first part.

3. The bush according to claim 1, wherein the elastic brim includes an area increasing portion in which an area is increased along a circumferential direction of the elastic brim.

4. The bush according to claim 3, wherein the elastic brim is formed in an elliptical shape.

5. The bush according to claim 1, wherein an engaging pawl is formed on a second edge of the outer cylinder opposite the first edge, wherein the engaging pawl is configured to extend axially outwardly beyond the cylindrical holding member and to engage with a second end face of the cylindrical holding member opposite said first end face.

6. The bush according to claim 4, wherein the outer cylinder is formed by resin injection molding.

7. The bush according to claim 1, wherein the elastic brim is formed so as to have a thickness that is substantially constant.

8. A bush which is internally engaged in a cylindrical holding member, said bush comprising:
    an inner cylinder;
    an outer cylinder;
    a cylindrical elastic member interposed between the inner cylinder and the outer cylinder;
    a flange formed along a circumference of one edge of the outer cylinder; and
    an elastic brim extending from the cylindrical elastic member;
    wherein the flange engages with an end face of the cylindrical holding member,
    the elastic brim covers an end face of the flange, and
    the elastic brim includes an area increasing portion in which an area is increased along a circumferential direction of the elastic brim, the area increasing portion including a first area increasing portion formed on a first part of the elastic brim, and a second area increasing portion formed on a second part of the elastic brim which is substantially diametrically opposed to said first part.

9. The bush according to claim 8, wherein the elastic brim is formed in an elliptical shape.

10. A suspension of a vehicle comprising:
    a pair of trailing arms, each having a cylindrical holding member at a front end portion thereof;
    a torsion beam which connects intermediate portions of the trailing arms; and
    a bush which is internally engaged in each of the cylindrical holding members, respectively, wherein each of the bushes comprises:
    an inner cylinder;
    an outer cylinder;
    a cylindrical elastic member interposed between the inner cylinder and the outer cylinder;
    a flange formed along a circumference of one edge of the outer cylinder; and
    an elastic brim extending from the cylindrical elastic member,
    wherein the flange engages with one end face of the cylindrical holding member,
    the elastic brim covers an end face of the flange, and
    the flange includes a thick portion that protrudes toward the elastic brim side and increases in thickness as the flange extends radially outwardly, said thick portion protruding further outwardly, in a direction towards the elastic brim, than a central portion of the flange.

11. The suspension of a vehicle according to claim 10, wherein the thick portion includes a first thick portion formed on a front side of the flange with respect to the vehicle and a second thick portion formed on the rear side of the flange with respect to the vehicle.

* * * * *